(12) United States Patent
Wang et al.

(10) Patent No.: US 11,658,336 B2
(45) Date of Patent: May 23, 2023

(54) LITHIUM-ION SOLID STATE CONDUCTOR CONTAINING A COMPOUND OF $LI_{1+(4-a)\alpha}HF_{2-\alpha}M^a_\alpha(PO_{4-\delta})_3$, ELECTRODE AND BATTERY INCLUDING THE CONDUCTOR, AND METHODS OF MANUFACTURE THEREOF

(71) Applicants: Samsung Electronics Co., Ltd., Suwon-si (KR); The Florida State University Research Foundation, Inc., Tallahassee, FL (US)

(72) Inventors: Yan Wang, Brookline, MA (US); Lincoln Miara, Lincoln, MA (US); Yan-Yan Hu, Tallahassee, FL (US); Xuyong Feng, Tallahassee, FL (US)

(73) Assignees: SAMSUNG ELECTRONICS CO., LTD., Gyeonggi-do (KR); THE FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 856 days.

(21) Appl. No.: 16/550,777

(22) Filed: Aug. 26, 2019

(65) Prior Publication Data
US 2020/0176812 A1  Jun. 4, 2020

Related U.S. Application Data (60) Provisional application No. 62/820,670, filed on Mar. 19, 2019, provisional application No. 62/773,375, filed on Nov. 30, 2018.

(51) Int. Cl.
| | |
|---|---|
| H01M 10/00 | (2006.01) |
| H01M 10/0562 | (2010.01) |
| H01M 4/36 | (2006.01) |
| H01M 10/0525 | (2010.01) |
| H01M 4/58 | (2010.01) |
| C01G 27/00 | (2006.01) |
| H01M 4/485 | (2010.01) |
| C01B 25/37 | (2006.01) |
| H01M 50/451 | (2021.01) |
| H01M 50/454 | (2021.01) |
| H01M 50/491 | (2021.01) |
| H01M 50/489 | (2021.01) |
| H01M 50/437 | (2021.01) |

(52) U.S. Cl.
CPC ....... *H01M 10/0562* (2013.01); *C01B 25/372* (2013.01); *C01G 27/006* (2013.01); *H01M 4/366* (2013.01); *H01M 4/485* (2013.01); *H01M 4/5815* (2013.01); *H01M 4/5825* (2013.01); *H01M 10/0525* (2013.01); *H01M 50/451* (2021.01); *H01M 50/454* (2021.01); *H01M 50/437* (2021.01); *H01M 50/489* (2021.01); *H01M 50/491* (2021.01); *H01M 2300/0068* (2013.01)

(58) Field of Classification Search
CPC ..... C01B 25/45; C01B 25/372; C01G 27/006; C01D 15/00; C01F 17/30; H01M 10/0525; H01M 10/052; H01M 10/0562; H01M 4/5825; H01M 4/485; H01M 4/5815; H01M 4/366; H01M 50/446; H01M 50/449; H01M 50/454; H01M 50/451; H01M 50/431
See application file for complete search history.

(56) References Cited

U.S. PATENT DOCUMENTS

| | | | |
|---|---|---|---|
| 8,182,943 | B2 | 5/2012 | Visco et al. |
| 9,755,272 | B2 | 9/2017 | Gaben et al. |
| 9,859,559 | B2 | 1/2018 | Kim et al. |
| 10,033,066 | B2 | 7/2018 | Nemori et al. |
| 10,109,851 | B2 | 10/2018 | Song et al. |
| 2015/0333376 | A1 | 11/2015 | Gaben |
| 2016/0064770 | A1 | 3/2016 | Lee et al. |
| 2018/0083314 | A1 | 3/2018 | Harada et al. |
| 2018/0090782 | A1 | 3/2018 | Choi et al. |
| 2018/0205112 | A1* | 7/2018 | Thomas-Alyea ... H01M 4/0404 |

FOREIGN PATENT DOCUMENTS

CN  105609881 A  5/2016

OTHER PUBLICATIONS

Aono, H., et al., "Electrical properties and crystal structure of solid electrolyte based on lithium hafnium phosphate LiHF2(PO4)3", Solid State Ionics, vol. 62, 1993, pp. 309-316.
Losilla, E. R., et al., "NASICON to scandium wolframate transition in Li1+xMxHf2-x(PO4)3 (M = Cr, Fe): structure and ionic conductivity", Solid State Ionics, vol. 112, 1998, pp. 53-62.

\* cited by examiner

*Primary Examiner* — Steven J Bos
(74) *Attorney, Agent, or Firm* — Cantor Colburn LLP (57) ABSTRACT

A compound of Formula 1

$$Li_{1+(4-a)\alpha}Hf_{2-\alpha}M^a_\alpha(PO_{4-\delta})_3 \qquad (1)$$

is disclosed, wherein M is at least one cationic element having a valence of a, wherein $0<\alpha\leq\frac{2}{3}$, $1\leq a\leq 4$, and $0\leq\delta\leq 0.1$. Also described are an electrolyte composition, a separator, a protected positive electrode, a protected negative electrode, and a lithium battery, each including the compound of Formula 1.

11 Claims, 10 Drawing Sheets

LITHIUM-ION SOLID STATE CONDUCTOR CONTAINING A COMPOUND OF $LI_{1+(4-a)\alpha}HF_{2-\alpha}M^{a}{}_{\alpha}(PO_{4-\delta})_3$, ELECTRODE AND BATTERY INCLUDING THE CONDUCTOR, AND METHODS OF MANUFACTURE THEREOF

CROSS-REFERENCE TO RELATED APPLICATION

This application claims priority to U.S. Provisional Patent Application No. 62/773,375 filed on Nov. 30, 2018, and U.S. Provisional Patent Application No. 62/820,670 filed on Mar. 19, 2019, in the United States Patent and Trademark Office, and all the benefits accruing therefrom under 35 U.S.C. § 119, the contents of which are incorporated herein in their entirety by reference.

BACKGROUND

1. Field

Disclosed is a lithium-ion solid state-conductor, electrode, and battery, each including the conductor, and methods of manufacture thereof.

2. Description of the Related Art

Solid-state lithium batteries are of interest because they can potentially offer improved specific energy and energy density, improved safety, and in some configurations improved power density. However, currently available solid-state electrolyte materials are not sufficiently stable to lithium metal. Also, the lithium conductivity of available materials is significantly less than liquid alternatives. Thus there remains a need for an improved solid-state lithium conductor, and an electrochemical cell including the same.

SUMMARY

Disclosed is a compound of Formula 1

$$Li_{1+(4-a)\alpha}Hf_{2-\alpha}M^{a}{}_{\alpha}(PO_{4-\delta})_3 \quad (1)$$

wherein M is at least one cationic element with valence of +a, wherein $0<\alpha\leq 2/3$, $1\leq a\leq 4$, and $0\leq\delta\leq 0.1$.

Also disclosed is a protected negative electrode including a negative active material; and the compound of Formula 1 on a surface of the negative active material.

Also disclosed is an electrolyte composition, the composition comprising the compound of Formula 1.

Also disclosed is a separator including: a microporous film, and the compound of Formula 1 on the microporous film.

Also disclosed is a protected positive active material including: a lithium transition metal oxide, a lithium transition metal phosphate, or a combination thereof; and the compound of Formula 1 on a surface of the lithium transition metal oxide.

A lithium battery, comprising: a negative electrode; an electrolyte; and a positive electrode, wherein the electrolyte is between the negative electrode and the positive electrode, and wherein the negative electrode comprises the protected negative electrode.

Also disclosed is a lithium battery including: a negative electrode; an electrolyte; and a positive electrode, wherein the electrolyte is between the negative electrode and the positive electrode, and wherein the positive electrode comprises the protected positive active material.

Also disclosed is a lithium battery including: a negative electrode; an electrolyte; and a positive electrode, wherein the electrolyte is between the negative electrode and the positive electrode, and wherein the electrolyte comprises the compound of Formula 1.

Also disclosed is a lithium battery including: a negative electrode; a separator comprising a microporous film; and a positive electrode, wherein the electrolyte is between the negative electrode and the positive electrode, and wherein the separator comprises the compound of Formula 1.

Also disclosed is a method of manufacturing the compound of Formula 1, the method including: contacting a compound comprising lithium, a compound comprising hafnium, and a compound comprising element M to form a mixture; and heat-treating the mixture to manufacture the compound of Formula 1.

Also disclosed is a method of manufacturing the lithium battery, the method including: providing a negative electrode; providing a positive electrode; and disposing a solid electrolyte between the positive electrode and the negative electrode, wherein at least one of the negative electrode, the positive electrode, and the solid electrolyte comprises the compound of Formula 1.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Disclosed is a lithium conducting solid having improved stability and conductivity. The disclosed material may be used as a solid separator in a lithium battery, to protect a lithium metal negative electrode in a lithium battery, or to protect a positive active material in a lithium battery, for example.

Figure 1:
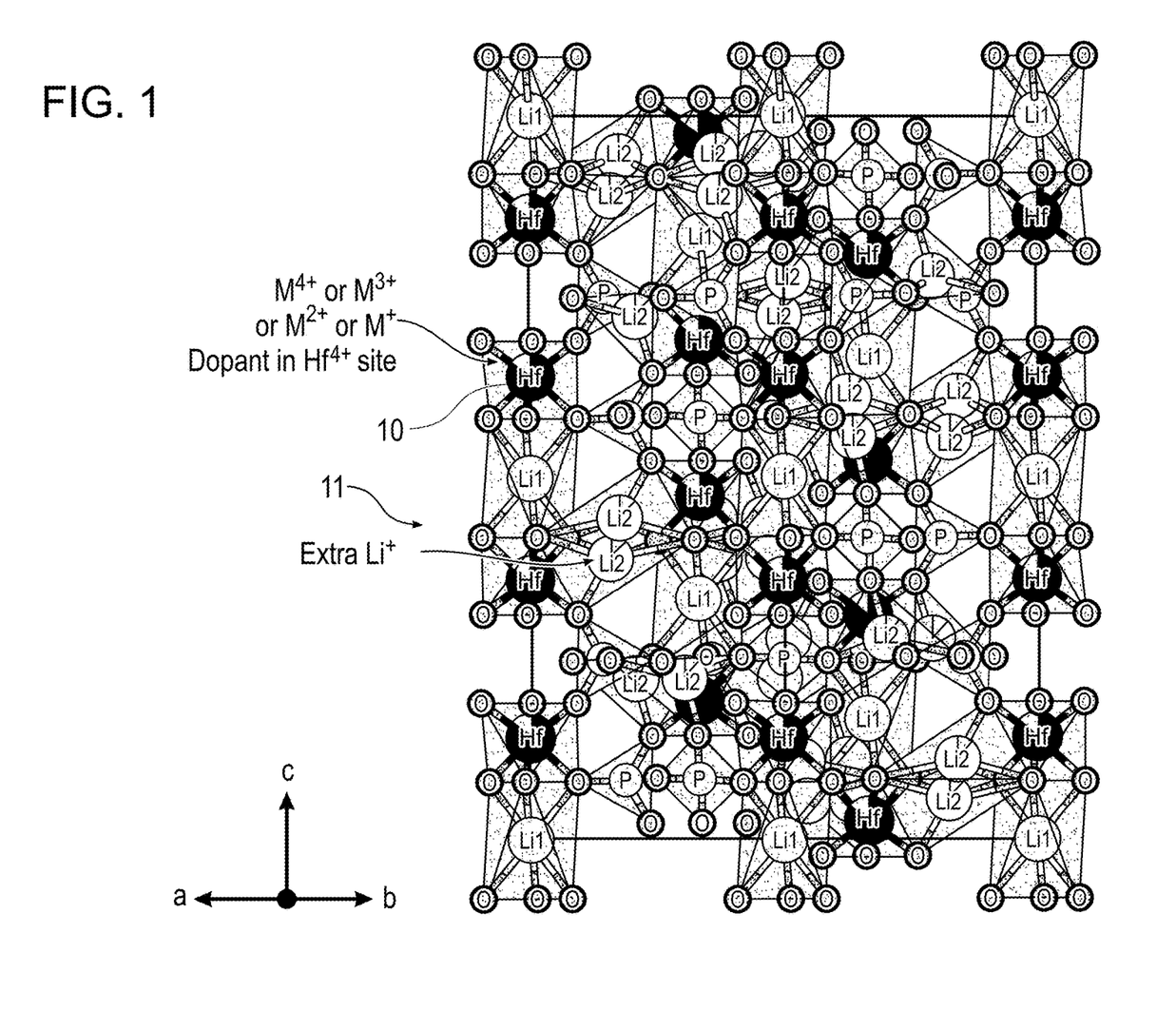
FIG. 1 is schematic diagram of the structure of the compound of Formula 1.

Disclosed is a compound of Formula 1

$$Li_{1+(4-a)\alpha}Hf_{2-\alpha}M^{a}{}_{\alpha}(PO_{4-\delta})_3 \quad (1)$$

wherein M is at least one cationic element with valence of a, wherein $0<\alpha\leq 2/3$, $1\leq a\leq 4$, and $0\leq\delta\leq 0.1$. While not wanting to be bound by theory, it is understood that in the compound of Formula 1, the M dopant resides on an Hf$^{4+}$ site 10 in the crystal structure of the compound of Formula 1, and lithium greater than a stoichiometry of 1 in Formula 1 resides in the HfO$_2$ layer 11 of the crystal structure, as shown in FIG. 1. It is understood that the improved conductivity and stability result from having the dopant M on the $Hf^{4+}$ sites and that the lithium greater than a stoichiometry of 1 in Formula 1, e.g., $(4-a)\alpha$ in Formula 1, is accommodated in an interstitial site and on the Hf site, and the charge is compensated with a lower valent cation, e.g., a cation having a valence of 1, 2, or 3. Thus M and Hf share the $Hf^{4+}$ sites, and the occupancy of the $Hf^{4+}$ sites can be determined by the content of Hf and M.

In an aspect a may be 1, and M may be a monovalent cation. M may be an alkali metal cation. $Li^+$, $Na^+$, $K^+$, and $Rb^+$ are mentioned. M may be a monovalent transition metal, and may be $Cu^+$, $Ag^+$, or $Au^+$. A combination comprising at least one of the foregoing may be used. In an aspect where M is Li, disclosed is a compound of Formula 1A $$Li_{1+4\alpha}Hf_{2-\alpha}(PO_{4-\delta})_3 \tag{1A}$$

wherein $0<\alpha\leq\frac{2}{3}$, and $0\leq\delta\leq0.1$. In an aspect, $0.1<\alpha\leq\frac{2}{3}$, and $0\leq\delta\leq0.1$, or $0.2<\alpha\leq0.5$, and $0\leq\delta\leq0.1$.

In an aspect a may be 2, and M may be a divalent cation. M may be an alkaline earth metal cation. $Mg^{2+}$, $Ca^{2+}$, $Sr^{2+}$, and $Ba^{2+}$ are mentioned. M may be a divalent transition metal, and may be $Zn^{2+}$, for example. A combination comprising at least one of the foregoing may be used.

In an aspect a may be 3, and M may be a trivalent cation. M may be a cation of a Group 3 element, a lanthanide, a Group 13 element, or a combination thereof $Y^{3+}$, $Ga^{3+}$, $In^{3+}$, $Al^{3+}$, $La^{3+}$, $Sc^{3+}$ are mentioned. A combination comprising at least one of the foregoing may be used.

In an aspect a may be 4, and M may be a quadravalent cation. M may be a cation of a Group 4 element, a Group 14 element, or a combination thereof. $Ti^{4+}$, $Zr^{4+}$, $Si^{4+}$, $Ge^{4+}$, $Sn^{4+}$ are mentioned. A combination comprising at least one of the foregoing may be used.

In an aspect, M may comprise a combination of the monovalent, the divalent, the trivalent, and the quadravalent cation. When M comprises a combination of cations, a in Formula 1 is the average valence of M. For example, if M comprises equal amounts of a monovalent cation and a divalent cation, a in Formula 1 would be 1.5.

The content of M in Formula 1 may be $0<\alpha\leq\frac{2}{3}$, $0.05\leq\alpha\leq0.6$, $0.1\leq\alpha\leq0.5$, or $0.15\leq\alpha\leq0.4$.

The compound of Formula 1 may comprise an oxygen vacancy, wherein a content of the oxygen vacancy $\delta$ may be $0\leq\delta\leq0.1$, $0<\delta\leq0.1$, $0<\delta<0.1$, or $0.01<\delta<0.05$.

The compound of Formula 1 can be in any suitable form, such as that of a particle or film. The particle can have, for example, a spherical form, an oval-spherical form, or the like. The particle diameter is not particularly limited, and a mean particle diameter ranging, for example, from 0.01 to 30 μm, for example, 0.1 to 20 μm is mentioned. A mean particle diameter refers to a number average diameter (D50) of the particle size distribution of particles obtained by light scattering, or the like. The solid electrolyte can be prepared, for example, by mechanical milling to provide a suitable particle size. The film may have any suitable dimensions, and may have a thickness of 1 nanometer (nm) to 1 micrometer (μm), 10 nm to 800 nm, or 100 nm to 600 nm.

It has been discovered that the compound of Formula 1 has unexpected stability at the electrochemical potential of lithium, and is useful to protect a negative active material, such as lithium metal. Disclosed is a protected negative electrode, comprising: a negative active material; and the compound of claim 1 on a surface of the negative active material. Mentioned is an aspect in which M in Formula 1 is Li, Na, Mg, Ca, La, Sc, or a combination thereof.

Compounds of Formula 1, wherein M is Li, Na, Mg, Ca, La, Sc, or a combination thereof, provide unexpectedly improved stability, are stable when in contact with lithium metal, and cannot be reduced by lithium metal. A suitable negative active material includes a material capable of storing and releasing lithium ions electrochemically. A negative active material can comprise lithium-containing metals and alloys, for example lithium metal, or a lithium alloy comprising Si, Sn, Sb, Ge, or a combination thereof. Lithium-containing metal oxides, metal nitrides, and metal sulfides are also useful. Mentioned is an aspect wherein the metal is Ti, Mo, Sn, Fe, Sb, Co, V, or a combination thereof. A carbon, such as a hard carbon, soft carbon, carbon black, Ketjen black, acetylene black, activated carbon, carbon nanotubes, carbon fiber, graphite, or an amorphous carbon can be used. Also usable is phosphorous (P), or a metal doped with phosphorous (e.g., $NiP_3$). The negative active material is not limited to the foregoing and any suitable negative active material can be used. In an embodiment the negative active material is disposed on a current collector, such as a copper current collector, to provide a negative electrode. In an aspect, the negative electrode comprises graphite. In an aspect, the negative electrode comprises lithium metal or a lithium metal alloy. Use of lithium metal is mentioned.

Also disclosed is an electrolyte comprising the compound of Formula 1. In an aspect the compound of Formula 1 can be combined with another lithium conductive material to provide an electrolyte composition comprising the compound of Formula 1. The lithium conductive material can comprise a glass, a ceramic, or a combination thereof. The lithium conductive material can comprise a sulfide solid electrolyte or an oxide solid electrolyte, such as a garnet-type solid state electrolyte.

The sulfide solid electrolyte may comprise $Li_2S-P_2S_5$, $Li_2S-P_2S_5-LiX$, wherein X is a halogen element, $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$, wherein m and n are positive numbers, Z is one of Ge, Zn or Ga, $Li_2S-GeS_2$, $Li_2S-SiS_2-Li_3PO_4$, $Li_2S-SiS_2-Li_pM^1O_q$ wherein p and q are positive numbers, $M^1$ is P, Si, Ge, B, Al, Ga, or In, $Li_{7-x}PS_{6-x}Cl_x$ wherein $0<x<2$, $Li_{7-x}PS_{6-x}Br_x$ wherein $0<x<2$, or $Li_{7-x}PS_{6-x}I_x$ wherein $0<x<2$. Mentioned are $Li_6PS_5Cl$, $Li_6PS_5Br$, or $Li_6PS_5I$.

The oxide solid electrolyte may comprise $Li_{1+x+y}Al_xTi_{2-x}Si_yP_{3-y}O_{12}$ wherein $0<x<2$, $0\leq y<3$, $BaTiO_3$, $Pb(Zr_{1-x}Ti_x)O_3$ wherein $0\leq x\leq 1$, $Pb_{1-x}La_xZr_{1-y}Ti_yO_3$ wherein $0\leq x<1$, $0\leq y<1$, $Pb(Mg_{1/3}Nb_{2/3})O_3-PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_xTi_y(PO_4)_3$ wherein $0<x<2$, $0<y<3$, $Li_xAl_yTi_z(PO_4)_3$, $0<x<2$, $0<y<1$, $0<z<3$), $Li_{1+x+y}(Al_{(1-m)}Ga_m)_x(Ti_{(1-n)}Ge_n)_{2-x}Si_yP_{3-y}O_{12}$ ($0\leq x\leq 1$, $0\leq y\leq 1$, $0\leq m\leq 1$, and $0\leq n\leq 1$, $Li_xLa_yTiO_3$ wherein $0<x<2$, $0<y<3$, $Li_xGe_yP_zS_w$ wherein $0<x<4$, $0<y<1$, $0<z<1$, and $0<w<5$, $Li_xN_y$ wherein $0<x<4$ and $0<y<2$, $SiS_2$, $Li_xSi_yS_z$ wherein $0<x<3$, $0<y<2$, $0<z<4$, $Li_xP_yS_z$ wherein $0<x<3$, $0<y<3$ and $0<z<7$, $Li_2O$, $LiF$, $LiOH$, $Li_2CO_3$, $LiAlO_2$, a $Li_2O-Al_2O_3-SiO_2-P_2O_5-TiO_2-GeO_2$ ceramic, a garnet ceramics of the formula $Li_{3+x}La_3M^1{}_2O_{12}$ wherein $M^1$ is Te, Nb or Zr and x is an integer of 1 to 10, or a combination thereof. Mentioned is $(La_{1-x}Li_x)TiO_3$ (LLTO) wherein $0<x<1$.

Mentioned is a garnet-type oxide. The garnet-type oxide can be of the formula $Li_{5+x}E_3(Me^2{}_zMe^2{}_{(2-z)})O_d$ wherein E is a trivalent cation; $Me^1$ and $Me^2$ are each independently one of a trivalent, tetravalent, pentavalent, and a hexavalent cation; $0<x\leq 3$, $0\leq z<2$, and $0<d\leq 12$; and O can be partially or totally substituted with a pentavalent anion, a hexavalent anion, a heptavalent anion, or a combination thereof. For example, E can be partially substituted with a monovalent or divalent cation. In another embodiment, for example, in the solid ion conductor, when $0<x\leq 2.5$, E may be La and $Me^2$ can be Zr.

In an embodiment, the garnet-type oxide can be of the formula $Li_{5+x+2y}(D_yE_{3-7})(Me^1{}_zMe^2{}_{2-z})O_d$ wherein D is a monovalent or divalent cation; E is a trivalent cation; $Me^1$ and $Me^2$ are each independently a trivalent, tetravalent, pentavalent, or a hexavalent cation; $0<x+2y\leq 3$, $0\leq y\leq 0.5$, $0\leq z<2$, and $0<d\leq 12$; and O can be partially or totally substituted with a pentavalent anion, a hexavalent anion, a heptavalent anion, or a combination thereof. The preferred number of moles of lithium per formula unit (Li-pfu) in the above formula is $6<(5+x+2y)<7.2$, $6.2<(5+x+2y)<7$, $6.4<(5+x+2y)<6.8$. In the garnet-type oxides of the above formulas, D can comprise potassium (K), rubidium (Rb), cesium (Cs), calcium (Ca), barium (Ba), or strontium (Sr). In an embodiment, D is calcium (Ca), barium (Ba), or strontium (Sr). In the above formulas, Me can be a transition metal. For example, Me can be tantalum (Ta), niobium (Nb), yttrium (Y), scandium (Sc), tungsten (W), molybdenum (Mo), antimony (Sb), bismuth (Bi), hafnium (Hf), vanadium (V), germanium (Ge), silicon (Si), aluminum (Al), gallium (Ga), titanium (Ti), cobalt (Co), indium (In), Zinc (Zn), or chromium (Cr). Mentioned is $Li_{6.5}La_3Zr_{1.5}Ta_{0.5}O_{12}$.

The solid electrolyte may be porous. The porous structure of the electrolyte can refer to an electrolyte having micro- and/or nanostructural features, e.g., microporosity and/or nanoporosity. For example, the porosity of the solid electrolyte comprising the compound of Formula 1 can be 10 to 90%, or 20 to 80%, or 30 to 70%, including all intermediate values and ranges. The porosity of the first solid electrolyte and the second solid electrolytes can be the same or different. As used herein, "pores" can also refer to "voids."

The compound of Formula 1 can be combined with a liquid electrolyte. In an aspect, the liquid electrolyte is disposed in a pore of the solid electrolyte comprising the compound of Formula 1. The liquid electrolyte may comprise a polar aprotic solvent and a lithium salt. The polar aprotic solvent can be dimethylether, diethylether, dimethyl carbonate, diethyl carbonate, ethylmethyl carbonate, dipropyl carbonate, methylpropyl carbonate, ethylpropyl carbonate, ethylene carbonate, propylene carbonate, butylene carbonate, fluoroethylene carbonate, methyl acetate, ethyl acetate, n-propyl acetate, dimethylacetate, methyl propionate, ethyl propionate, γ-butyrolactone, decanolide, valerolactone, mevalonolactone, caprolactone, dibutyl ether, tetraglyme, diglyme, polyethylene glycol dimethylether, dimethoxy ethane, 2-methyl tetrahydrofuran, 2,2-dimethyl tetrahydrofuran, 2,5-dimethyl tetrahydrofuran, cyclohexanone, triethylamine, triphenylamine, triether phosphine oxide, acetonitrile, dimethyl formamide, 1,3-dioxolane, and sulfolane, but the organic solvent is not limited thereto and any suitable solvent can be used. In an embodiment, the solvent preferably comprises a carbonate ester, and more preferably comprises ethylene carbonate and propylene carbonate.

The lithium salt may comprise $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ in which the x and y are natural numbers, e.g., an integer of 1 to 20, LiCl, LiI, $LiB(C_2O_4)_2$, lithium bis(fluorosulfonyl)imide, or a combination thereof. The concentration of the lithium salt may be 0.1 to 2 molar (M), e.g., 0.5 to 1.3 M in the aprotic solvent.

The solid electrolyte may be used as a separator, or a microporous separator may be included between the positive electrode and negative electrode. In an aspect the compound of Formula 1 may be disposed on a surface of microporous material. In an aspect, the separator may comprise the compound of Formula 1 in combination with another lithium conductive material to provide a separator comprising the electrolyte composition comprising the compound of Formula 1 and the lithium conductive material. In an aspect, the separator comprises a glass fiber, polyester, polyethylene, polypropylene, polytetrafluoroethylene (PTFE), or a combination thereof. In an aspect the separator comprises a microporous polyolefin film, such as microporous polyethylene or polypropylene, and the compound of Formula 1 disposed thereon. A diameter of a pore of the microporous separator can be 0.01 micrometers (μm) to 10 μm, and a thickness of the separator can be in a range of 5 nm to 100 μm. For example, a porous separator comprising the compound of Formula 1 may have a pore size of 1 nm to 50 μm, 20 nm to 25 μm, or 100 nm to 5 μm. The solid-state electrolyte may be liquid-impermeable, may be non-porous, or may have a pore size of 0.01 μm to 1 μm, or 0.05 μm to 0.5 μm. In an aspect, the separator comprising the compound of Formula 1 may be porous.

A positive electrode comprises a positive active material layer comprising a positive active material, optionally on a current collector, e.g., an aluminum foil current collector, and optionally comprising a conductive agent and a binder. A protected positive active material may comprise: a lithium transition metal oxide, a lithium transition metal phosphate, a sulfide, or a combination thereof; and the compound of Formula 1 on a surface of the positive active material. A protected positive electrode may comprise the protected positive active material.

The positive active material can comprise a composite oxide of lithium and a metal selected from cobalt, manganese, aluminum, and nickel. For example, the positive active material can be a compound represented by any of the Formulas: $Li_pM^1{}_{1-q}M^2{}_qD_2$ wherein $0.90\leq p\leq 1.8$ and $0\leq q\leq 0.5$; $Li_pE_{1-q}M^2{}_qO_{2-x}D_x$ wherein $0.90\leq p\leq 1.8$, $0\leq q\leq 0.5$, and $0\leq x\leq 0.05$; $LiE_{2-q}M^2{}_qO_{4-x}D_x$ wherein $0\leq q\leq 0.5$ and $0\leq x\leq 0.05$; $Li_pNi_{1-q-r}Co_qM^2{}_rD_x$ wherein $0.90\leq p\leq 1.8$, $0\leq q\leq 0.5$, $0\leq r\leq 0.05$, and $0<x\leq 2$; $Li_pNi_{1-q-r}Co_pM^2{}_rO_{2-x}X_x$ wherein $0.90\leq p\leq 1.8$, $0\leq q\leq 0.5$, $0\leq r\leq 0.05$, and $0<x<2$; $Li_pNi_{1-q-r}Co_qM^2{}_rO_{2-x}X_x$ wherein $0.90\leq p\leq 1.8$, $0\leq q\leq 0.5$, $0\leq r\leq 0.05$, and $0<x<2$; $Li_pNi_{1-q-r}Mn_qM^2{}_rD_x$ wherein $0.90\leq p\leq 1.8$, $0\leq q\leq 0.5$, $0\leq r\leq 0.05$, and $0<x\leq 2$; $Li_pNi_{1-q-r}Mn_qM^2{}_rO_{2-x}X_x$ wherein $0.90\leq p\leq 1.8$, $0\leq q\leq 0.5$, $0\leq r\leq 0.05$, and $0<x<2$; $Li_pNi_{1-q-r}Mn_qM^2{}_rO_{2-x}X_x$ wherein $0.90\leq p\leq 1.8$, $0\leq q\leq 0.5$, $0\leq r\leq 0.05$, and $0<x<2$; $Li_pNi_qE_rG_dO_2$ wherein $0.90\leq p\leq 1.8$, $0\leq q\leq 0.9$, $0\leq r\leq 0.5$, and $0.001\leq d\leq 0.1$; $Li_pNi_qCo_rMn_dGeO_2$ wherein $0.90\leq p\leq 1.8$, $0\leq q\leq 0.9$, $0\leq r\leq 0.5$, $0\leq d\leq 0.5$, and $0.001\leq e\leq 0.1$; $Li_pNiG_qO_2$ wherein $0.90\leq p\leq 1.8$ and $0.001\leq q\leq 0.1$; $Li_pCoG_qO_2$ wherein $0.90\leq p\leq 1.8$ and $0.001\leq q\leq 0.1$; $Li_pMnG_qO_2$ where $0.90\leq p\leq 1.8$ and $0.001\leq q\leq 0.1$; $Li_pMn_2G_qO_4$ wherein $0.90\leq p\leq 1.8$ and $0.001\leq q\leq 0.1$; $QO_2$; $QS_2$; $LiQS_2$; $V_2O_5$; $LiV_2O_2$; $LiRO_2$; $LiNiVO_4$; $Li_{(3-f)}J_2(PO_4)_3$ ($0\leq f\leq 2$); $Li_{(3-f)}Fe_2(PO_4)_3$ wherein $0\leq f\leq 2$; and $LiFePO_4$, in which in the foregoing positive active materials $M^1$ is Ni, Co, or Mn; $M^2$ is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where $x=1$ or 2, $LiNi_{1-x}Mn_xO_{2x}$ where $0<x<1$, $LiNi_{1-x-y}Co_xMn_yO_2$ where $0 \le x \le 0.5$ and $0 \le y \le 0.5$, $LiFePO_4$, $TiS_2$, $FeS_2$, $TiS_3$, and $FeS_3$.

Mentioned is an aspect in which the positive active material is a NCA material represented by $Li_xNi_yE_zG_dO_2$, wherein $0.90 \le x \le 1.8$, $0 \le y \le 0.9$, $0 \le z \le 0.5$, $0.001 \le d \le 0.1$, E is Co, Mn, or a combination thereof, and G is Al, Cr, Mn, Fe, Mg, La, Ce, Sr, V, or a combination thereof. In an implementation, the positive active material may include, e.g., lithium cobalt oxide, lithium nickel cobalt manganese oxide, lithium nickel cobalt aluminum oxide, or a combination thereof.

Mentioned is a protected positive active material comprising the lithium transition metal oxide; and the compound of Formula 1 on a surface of the lithium transition metal oxide. While not wanting to be bound by theory, it is understood that the compound of Formula 1 is effective to protect the positive active material, e.g., to prevent or suppress reaction with the electrolyte.

The positive active material layer may further include a conductive agent and a binder. Any suitable conductive agent and binder may be used. A binder can facilitate adherence between components of the electrode, such as the positive active material and the conductor, and adherence of the electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong.

The conductive agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used.

Figure 2:
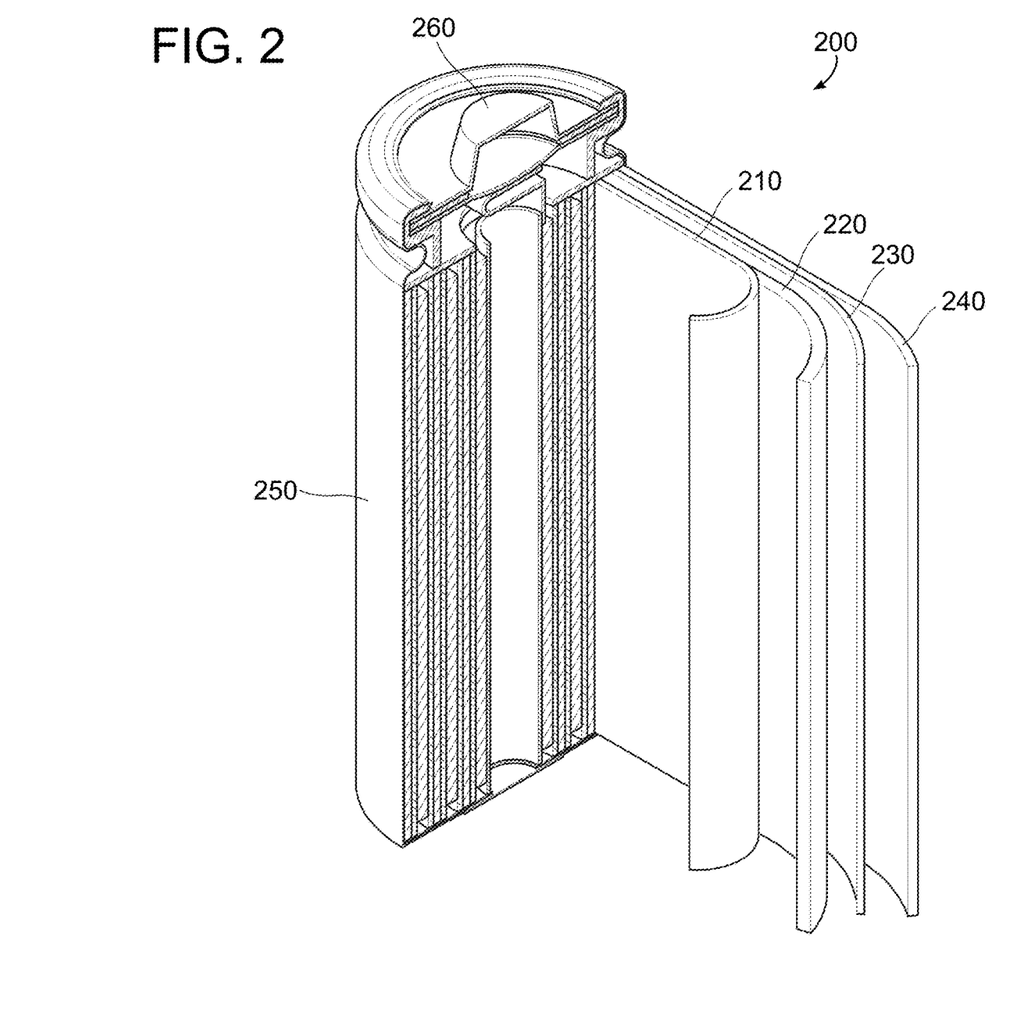
FIG. 2 is a schematic diagram of a battery.

An aspect of the lithium battery is shown in FIG. 2, which illustrates schematically a battery 200 comprising a negative electrode 210, a solid electrolyte 220, an optional separator 230 and a positive electrode 240. The electrode assembly may be disposed in a can 250 having a header 260.

In an aspect, a lithium battery comprises: a negative electrode; an electrolyte; and a positive electrode, wherein the electrolyte is between the negative electrode and the positive electrode, and wherein the positive electrode comprises the protected positive active material. In another aspect, a lithium battery comprises: a negative electrode; an electrolyte; and a positive electrode, wherein the electrolyte is between the negative electrode and the positive electrode, and wherein the electrolyte comprises the compound of Formula 1. In another aspect, a lithium battery comprises: a negative electrode; a separator comprising a microporous film; and a positive electrode, wherein the electrolyte is between the negative electrode and the positive electrode, and wherein the separator comprises the compound of Formula 1. In an aspect, a lithium battery comprises: a negative electrode; an electrolyte; and a positive electrode, wherein the electrolyte is between the negative electrode and the positive electrode, and wherein the negative electrode comprises the compound of Formula 1. In an aspect, the negative electrode is a protected negative electrode and comprises lithium metal and the compound of Formula 1 between the lithium metal and the electrolyte.

Also disclosed is a method of manufacturing the compound of Formula 1, the method comprising: contacting a compound comprising lithium, a compound comprising hafnium, and a compound comprising element M to form a mixture; and heat-treating the mixture to manufacture the compound of Formula 1. The compound comprising lithium, hafnium, and M may each independently be provided from a hydroxide, carbonate, oxide, or acetate starting material. For example, the compound comprising lithium may be lithium hydroxide, lithium carbonate, lithium acetate, or a combination thereof.

The compound comprising hafnium may be hafnium oxide, for example.

The compound comprising element M may be a hydroxide, oxide, or carbonate of M, e.g., a hydroxide, oxide, or carbonate of Li, Na, Mg, Ca, La, Sc, or a combination thereof. Examples include $Mg(OH)$, $CaCO_3$, $Sc_2(CO_3)_3$, $In_2(CO_3)_3$, and $Y_2(CO_3)_3$.

In an aspect, a method of manufacturing the lithium battery comprises: providing a negative electrode; providing a positive electrode; and disposing a solid electrolyte between the positive electrode and the negative electrode, wherein at least one of the negative electrode, the positive electrode, and the solid electrolyte comprises the compound of Formula 1.

The negative electrode can be produced from a negative active material composition including a negative active material, and optionally, the conductive agent, and the binder. In an embodiment the negative active material composition is disposed on a current collector, such as copper current collector to form a negative electrode. Screen printing, slurry casting, or powder compression may be used, the details of which may be determined by one of skill in the art without undue experimentation and are not further elaborated upon herein for clarity.

Similarly, the positive electrode can be produced from a positive active material composition including a positive active material, and optionally, the conductive agent, and the binder. In an embodiment the positive active material composition is disposed on a current collector, such as an aluminum current collector to form a positive electrode. Screen printing, slurry casting, or powder compression may be used, the details of which may be determined by one of skill in the art without undue experimentation and are not further elaborated upon herein for clarity.

A lithium battery may be manufactured by providing a negative electrode; providing a positive electrode; disposing the compound of Formula 1 on at least one of the positive electrode and the negative electrode; and disposing the negative electrode on the positive electrode to manufacture the lithium battery.

In an aspect, a film comprising the compound of Formula 1 can be provided on a release layer, the film disposed on at least one of the negative electrode and the positive electrode, the release layer removed, and then the negative electrode disposed on the positive electrode to manufacture the lithium battery. The film comprising the compound of Formula 1 may be a solid electrolyte, or a separator.

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

EXAMPLES

Example 1: Phase Stability

The energy above hull is determined for compounds according to Formula 1. Compounds having an energy above hull of less than 50 millielectron volts (meV) per atom at a temperature between 450° C. to 800° C. are observed to be stable and included in Table 1. The energy above hull is a measure of the energy penalty paid to dope the structure.

TABLE 1

| Dopant | Composition | Energy above hull (meV/atom) | Possible impurity phases during synthesis |
| --- | --- | --- | --- |
| without dopant | $LiHf_2(PO_4)_3$ | 0 | |
| Li | $Li_{5/3}Hf_{11/6}(PO_4)_3$ | 12.9 | $LiHf_2(PO_4)_3$, $Li_3PO_4$ |
| | $Li_{7/3}Hf_{5/3}(PO_4)_3$ | 24.1 | $LiHf_2(PO_4)_3$, $Li_3PO_4$ |
| | $Li_3Hf_{3/2}(PO_4)_3$ | 38.9 | $LiHf_2(PO_4)_3$, $Li_3PO_4$ |
| | $Li_{11/3}Hf_{4/3}(PO_4)_3$ | 49.8 | $LiHf_2(PO_4)_3$, $Li_3PO_4$ |
| Al | $Li_{7/6}Hf_{11/6}Al_{1/6}(PO_4)_3$ | 1.5 | $Li_3PO_4$, $LiHf_2(PO_4)_3$, $AlPO_4$ |
| | $Li_{4/3}Hf_{5/3}Al_{1/3}(PO_4)_3$ | 9.3 | $Li_3PO_4$, $LiHf_2(PO_4)_3$, $AlPO_4$ |
| | $Li_{3/2}Hf_{3/2}Al_{1/2}(PO_4)_3$ | 24.2 | $Li_3PO_4$, $LiHf_2(PO_4)_3$, $AlPO_4$ |
| | $Li_{5/3}Hf_{4/3}Al_{2/3}(PO_4)_3$ | 22.9 | $Li_3PO_4$, $LiHf_2(PO_4)_3$, $AlPO_4$ |
| Sc | $Li_{7/6}Hf_{11/6}Sc_{1/6}(PO_4)_3$ | 0 | $Li_3Sc_2(PO_4)_3$, $LiHf_2(PO_4)_3$ |
| | $Li_{4/3}Hf_{5/3}Sc_{1/3}(PO_4)_3$ | 1.0 | $Li_3Sc_2(PO_4)_3$, $LiHf_2(PO_4)_3$ |

TABLE 1-continued

| Dopant | Composition | Energy above hull (meV/atom) | Possible impurity phases during synthesis |
|---|---|---|---|
| | $Li_{3/2}Hf_{3/2}Sc_{1/2}(PO_4)_3$ | 16.8 | $Li_3Sc_2(PO_4)_3$, $LiHf_2(PO_4)_3$ |
| | $Li_{5/3}Hf_{4/3}Sc_{2/3}(PO_4)_3$ | 8.9 | $Li_3Sc_2(PO_4)_3$, $LiHf_2(PO_4)_3$ |
| Y | $Li_{4/3}Hf_{5/3}Y_{1/3}(PO_4)_3$ | 6.1 | $LiHf_2(PO_4)_3$, $YPO_4$, $Li_3PO_4$ |
| | $Li_{7/6}Hf_{11/6}Y_{1/6}(PO_4)_3$ | 0.5 | $LiHf_2(PO_4)_3$, $YPO_4$, $Li_3PO_4$ |
| | $Li_{3/2}Hf_{3/2}Y_{1/2}(PO_4)_3$ | 34.6 | $LiHf_2(PO_4)_3$, $YPO_4$, $Li_3PO_4$ |
| | $Li_{5/3}Hf_{4/3}Y_{2/3}(PO_4)_3$ | 31.5 | $LiHf_2(PO_4)_3$, $YPO_4$, $Li_3PO_4$ |
| Ga | $Li_{4/3}Hf_{5/3}Ga_{1/3}(PO_4)_3$ | 8.4 | $GaPO_4$, $LiHf_2(PO_4)_3$, $Li_3PO_4$ |
| In | $Li_{4/3}Hf_{5/3}In_{1/3}(PO_4)_3$ | 2.0 | $LiHf_2(PO_4)_3$, $Li_3In_2(PO_4)_3$ |
| Ca | $Li_{4/3}Hf_{11/6}Ca_{1/6}(PO_4)_3$ | 7.6 | $LiHf_2(PO_4)_3$, $Ca_3(PO_4)_2$, $Li_3PO_4$ |
| | $Li_{5/3}Hf_{5/3}Ca_{1/3}(PO_4)_3$ | 7.3 | $LiHf_2(PO_4)_3$, $Ca_3(PO_4)_2$, $Li_3PO_4$ |
| | $Li_2Hf_{3/2}Ca_{1/2}(PO_4)_3$ | 38.2 | $LiHf_2(PO_4)_3$, $Ca_3(PO_4)_2$, $Li_3PO_4$ |
| | $Li_{7/3}Hf_{4/3}Ca_{2/3}(PO_4)_3$ | 32.8 | $LiHf_2(PO_4)_3$, $Ca_3(PO_4)_2$, $Li_3PO_4$ |
| Mg | $Li_{4/3}Hf_{11/6}Mg_{1/6}(PO_4)_3$ | 2.8 | $LiMgPO_4$, $LiHf_2(PO_4)_3$, $Li_3PO_4$ |
| | $Li_{5/3}Hf_{5/3}Mg_{1/3}(PO_4)_3$ | 9.7 | $LiMgPO_4$, $LiHf_2(PO_4)_3$, $Li_3PO_4$ |
| | $Li_2Hf_{3/2}Mg_{1/2}(PO_4)_3$ | 26.7 | $LiMgPO_4$, $LiHf_2(PO_4)_3$, $Li_3PO_4$ |
| | $Li_{7/3}Hf_{4/3}Mg_{2/3}(PO_4)_3$ | 32.6 | $LiMgPO_4$, $LiHf_2(PO_4)_3$, $Li_3PO_4$ |

Example 2: Activation Energy and Ionic Conductivity when M is Y

Figure 3A:
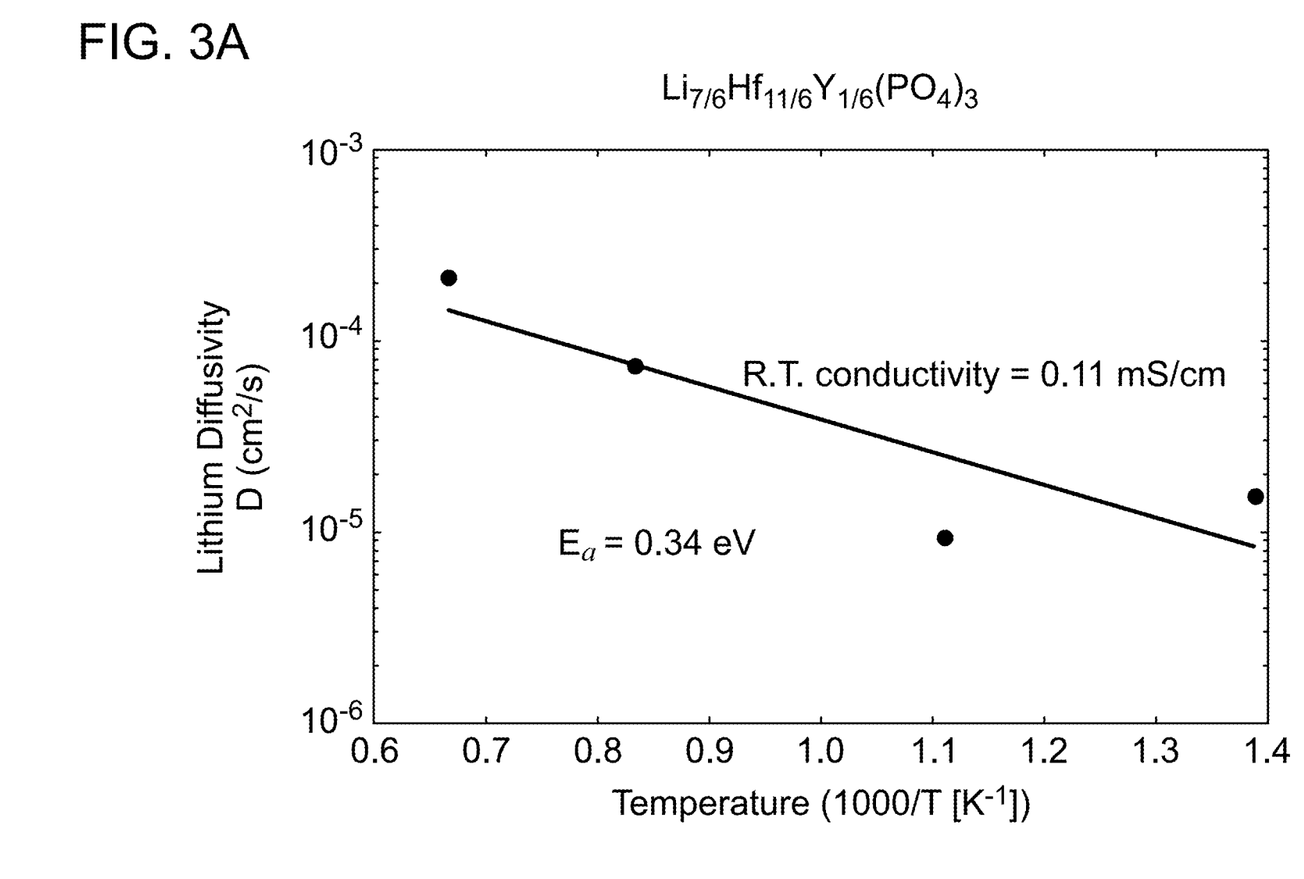
FIGS. 3A to 3C are graphs of lithium diffusivity (square centimeters per second) versus the inverse of temperature (Kelvin$^{-1}$) for $Li_{7/6}Hf_{11/6}Y_{1/6}(PO_4)_3$, $Li_{4/3}Hf_{5/3}Y_{1/3}(PO_4)_3$, and $Li_{3/2}Hf_{3/2}Y_{1/2}(PO_4)_3$, respectively.
Figure 3B:
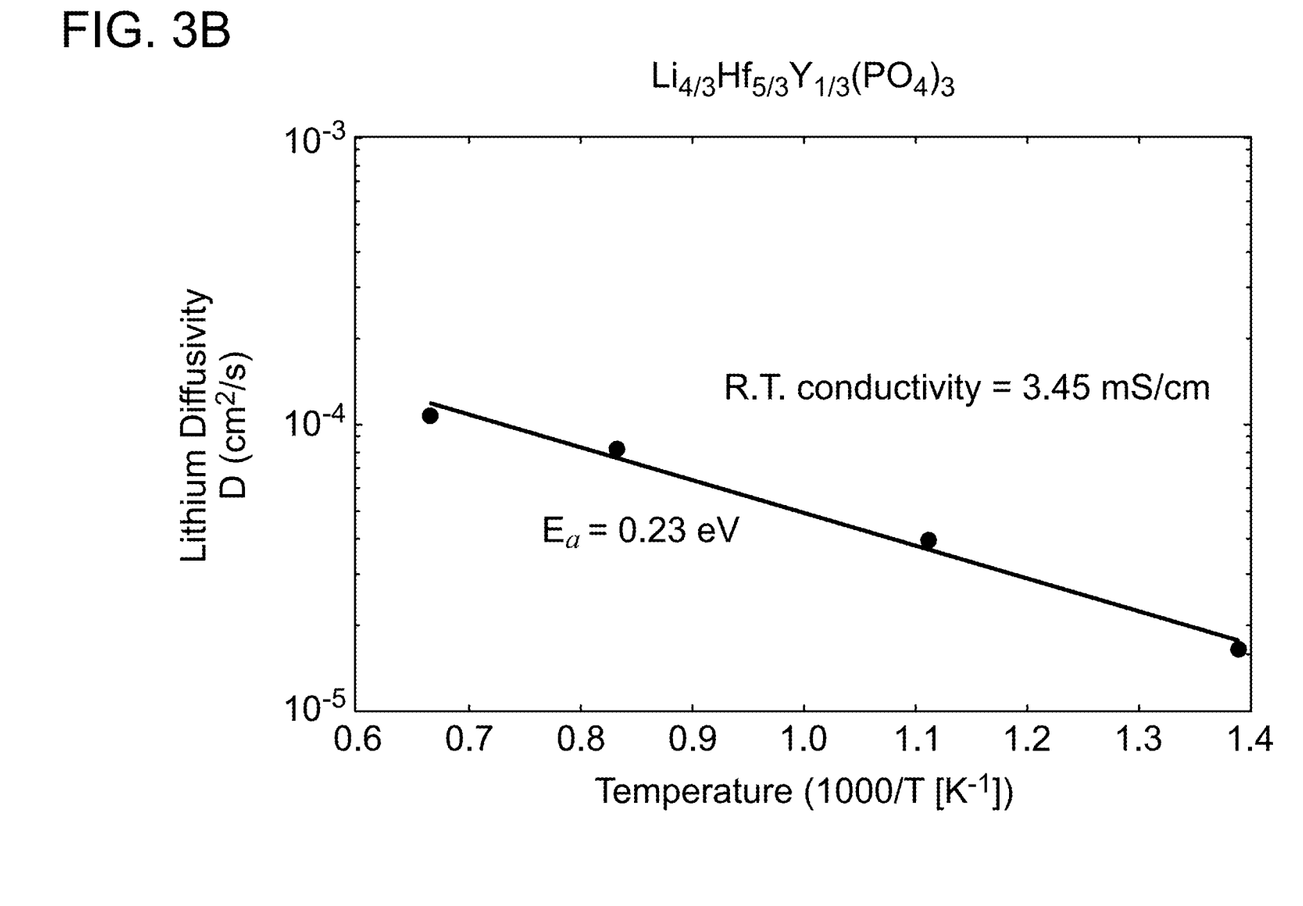
Figure 3C:
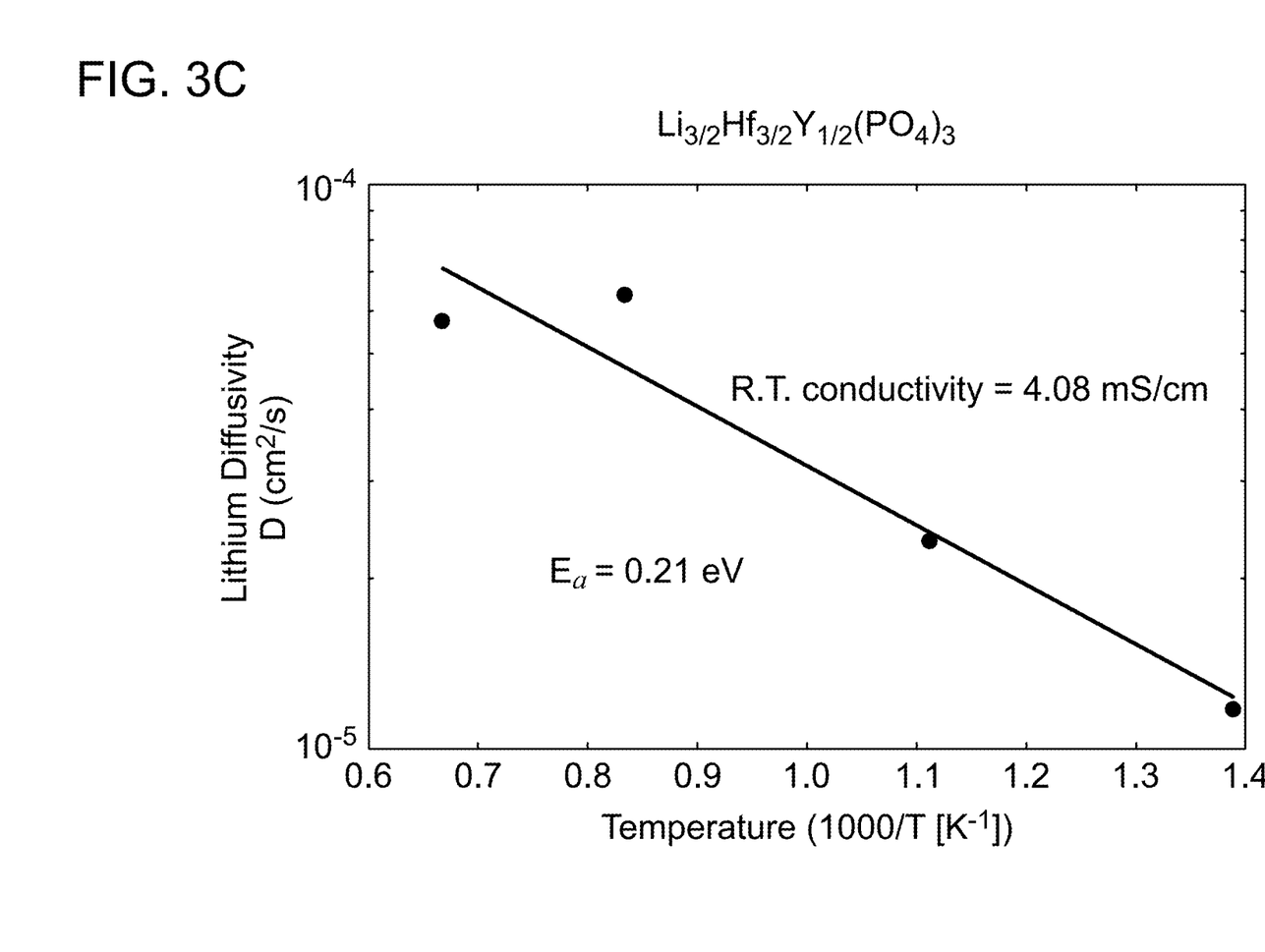

The activation energy and ionic diffusivity of the selected composition is determined at 600 Kelvin, 900 Kelvin, 1200 Kelvin, and 1500 Kelvin by ab initio molecular dynamics. The room temperature (300 Kelvin) ionic diffusivity is extrapolated from the results with elevated temperatures, and then converted to the ionic conductivity using the Nernst-Einstein relation. As shown in FIGS. 3A to 3C for three species in which M is Y and α is ⅙, ⅓, and ½, an activation energy of 0.21 electron volts (eV) to 0.34 eV and an ionic conductivity at 300 Kelvin of 0.11 millisiemens per centimeter (mS/cm) to 4.08 mS/cm is observed.

Example 3: Activation Energy and Ionic Conductivity when a=2

Figure 4A:
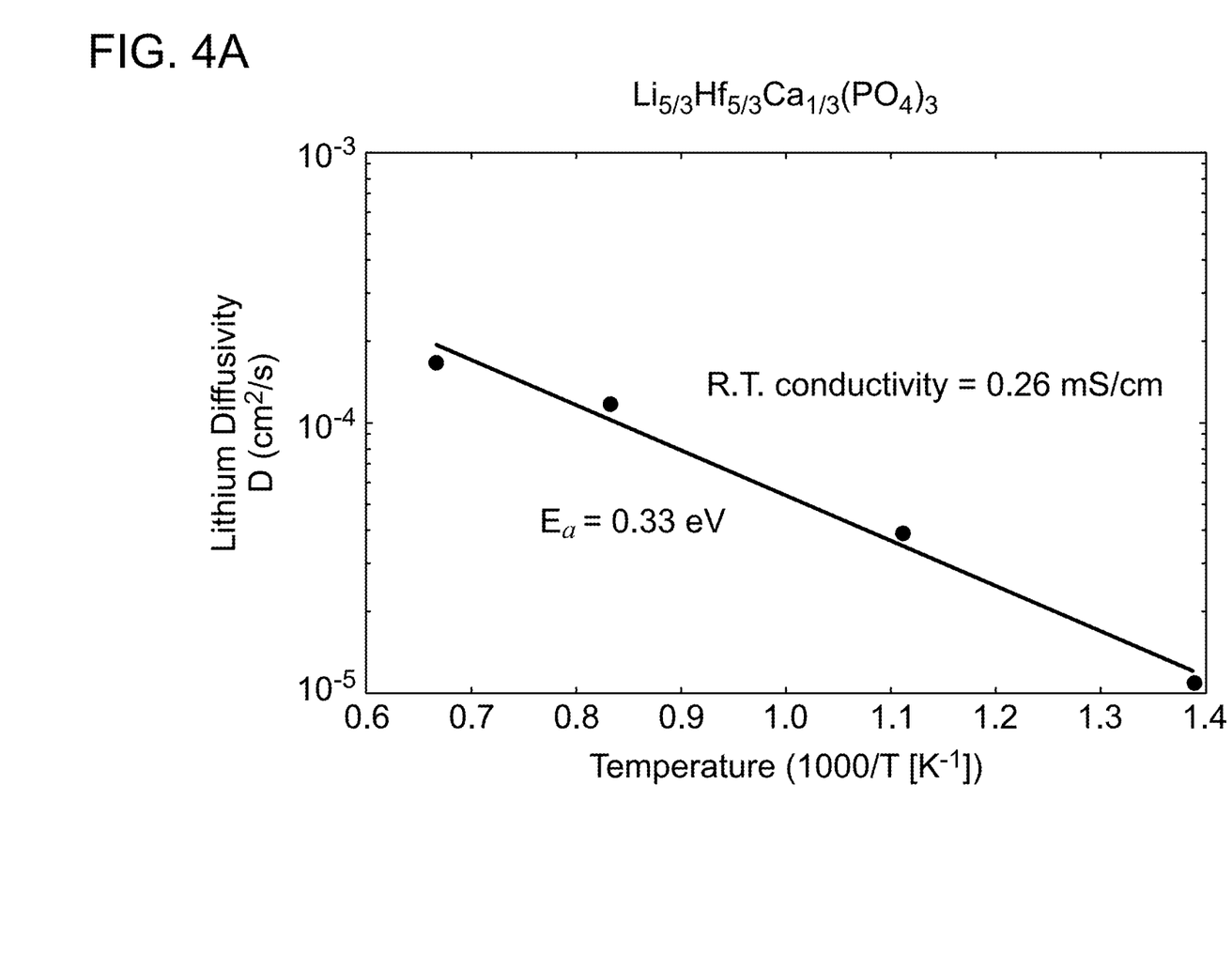
FIGS. 4A, 4B, and 4C are graphs of lithium diffusivity (square centimeters per second) versus the inverse of temperature (Kelvin$^{-1}$) for $Li_{5/3}Hf_{5/3}Ca_{1/3}(PO_4)_3$, $Li_{5/3}Hf_{5/3}Mg_{1/3}(PO_4)_3$, and $Li_{4/3}Hf_{5/3}Sc_{1/3}(PO_4)_3$, respectively.
Figure 4B:
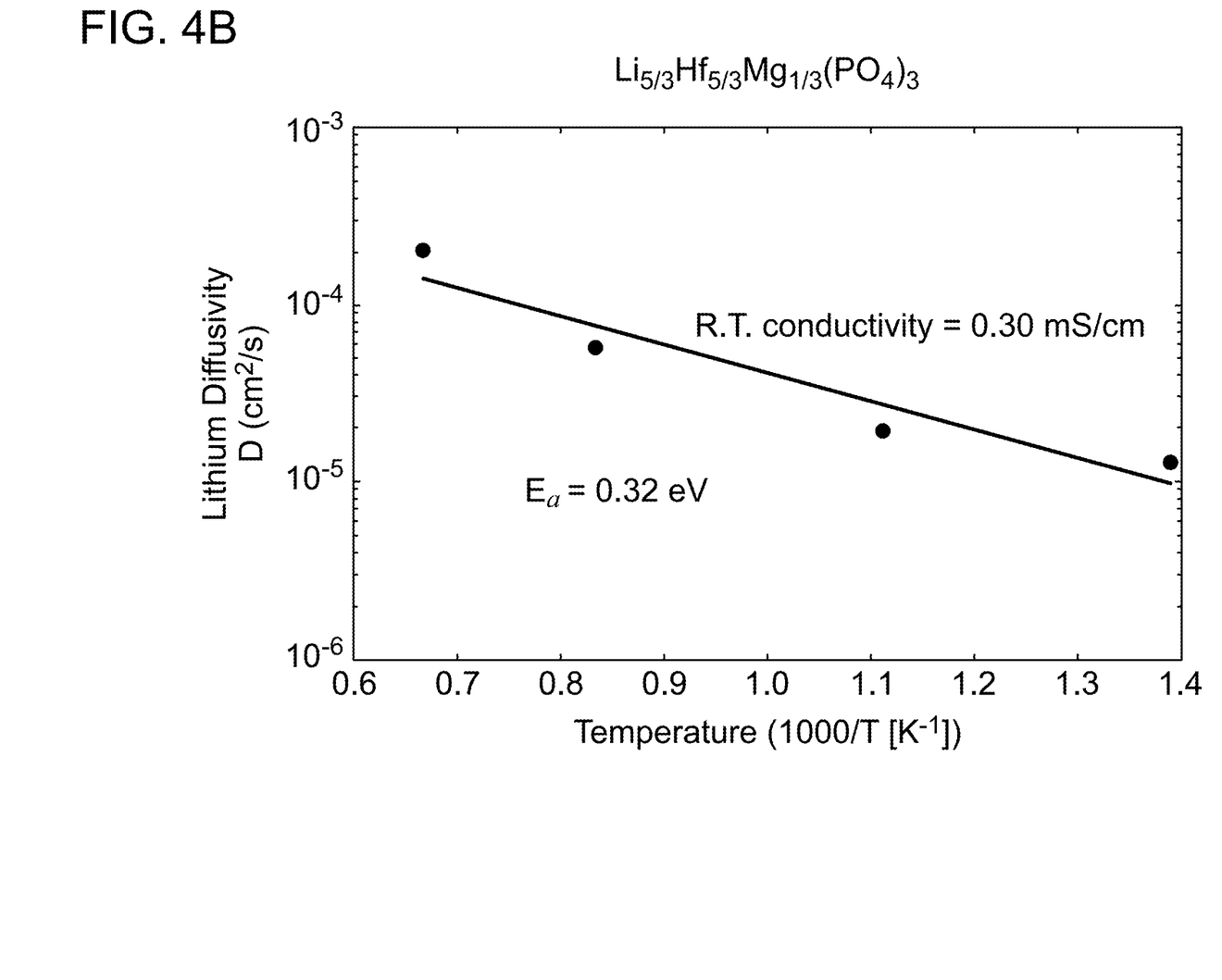
Figure 4C:
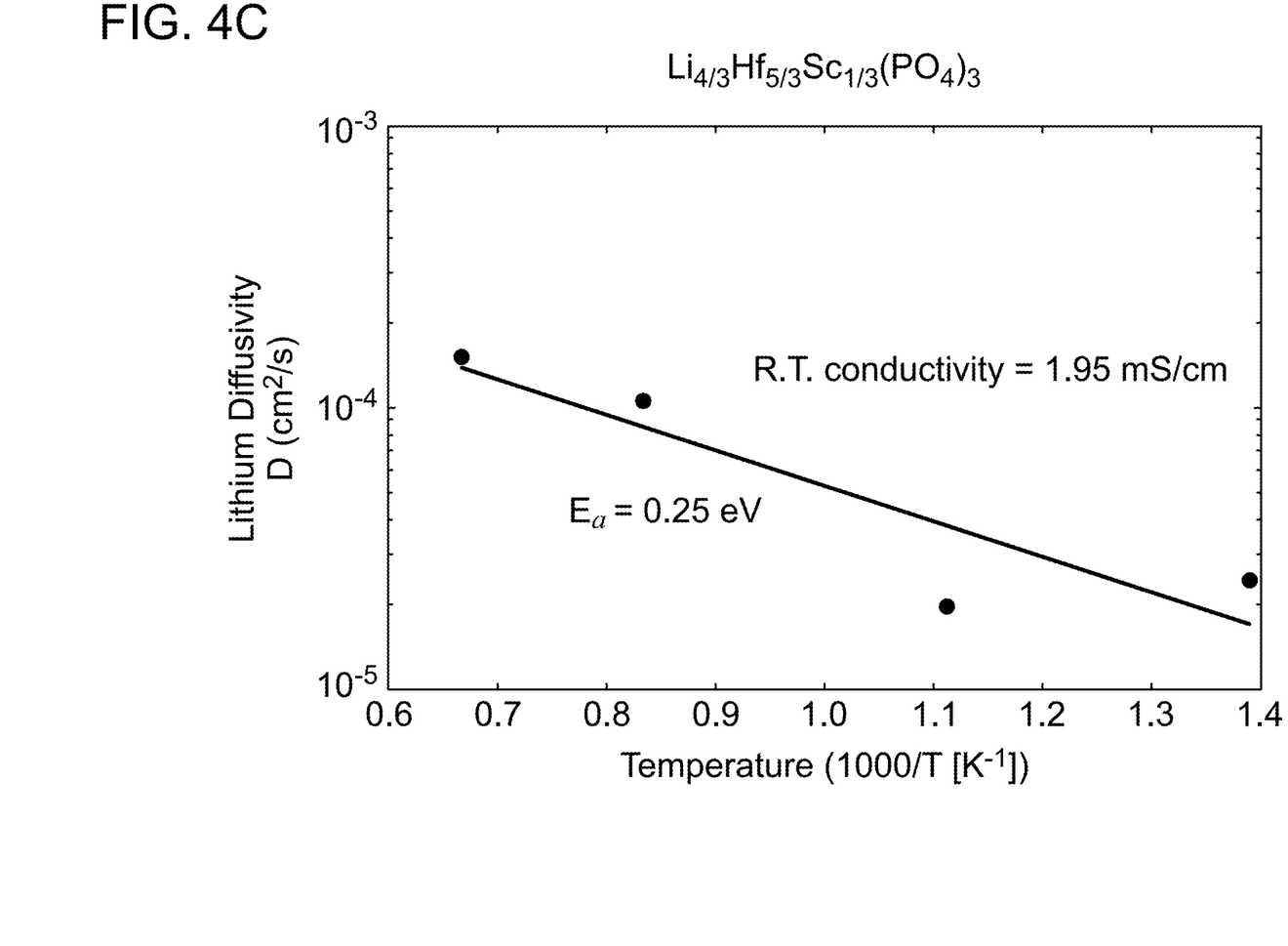

The activation energy and ionic diffusivity of the compound selected composition is determined at 600 Kelvin, 900 Kelvin, 1200 Kelvin, and 1500 Kelvin by ab initio molecular dynamics. The room temperature (300 Kelvin) ionic diffusivity is extrapolated from the results with elevated temperatures, and then converted to the ionic conductivity using the Nernst-Einstein relation. As shown in FIGS. 4A to 4C for species in which M is Ca, Mg, or Sc, i.e., a=2, and α is ⅓, an activation energy of 0.25 eV to 0.33 eV and an ionic conductivity at 300 Kelvin of 0.26 mS/cm to 1.95 mS/cm is observed.

Example 4. Electrochemical Stability

The stability of $Li_{4/3}Hf_{5/3}Y_{1/3}(PO_4)_3$, $Li_{4/3}Hf_{5/3}Sc_{1/3}(PO_4)_3$, and $Li_{5/3}Hf_{11/6}(PO_4)_3$ is evaluated between 0 and 8 volts versus $Li/Li^+$. $Li_{5/3}Hf_{11/6}(PO_4)_3$ comprises a Li dopant, and can be written as $Li_{1+3x}M_xHf_{2-x}(PO_4)_3$ with M=$Li^+$ and x=1/6. As shown in FIG. 4A and FIG. 4B, $Li_{4/3}Hf_{5/3}Y_{1/3}(PO_4)_3$ and $Li_{4/3}Hf_{5/3}Sc_{1/3}(PO_4)_3$ are intrinsically stable between 2.0 Volts (V) and 4.2 V. At 0 V versus $Li/Li^+$, the insulating products $LiYO_2$ or $LiScO_2$, $Li_3P$, and $Li_6Hf_2O_7$ form to provide a passivating layer at the $Li/Li_{4/3}Hf_{5/3}Y_{1/3}(PO_4)_3$ or $Li/Li_{4/3}Hf_{5/3}Sc_{1/3}(PO_4)_3$ interface having suitable ionic conductivity.

As shown in FIG. 4C, $Li_{5/3}Hf_{11/6}(PO_4)_3$, the intrinsic stability window of $Li_{5/3}Hf_{11/6}(PO_4)_3$ is 2.2 V to 4.2 V. The reaction with Li metal at 0 V versus $Li/Li^+$ forms the insulating products $Li_3P$ and $Li_6Hf_2O_7$, which can be pas-sivating. The interfacial reaction products, e.g., $Li_3P$ and $Li_6Hf_2O_7$, also have suitable ionic conductivity.

Example 5. Preparation of $Li_{1+x}M_yHf_{1-y}(PO_4)_3$ $Li_{1+x}M_yHf_{1-y}(PO_4)_3$ is prepared by combing stoichiometric amounts of $HfO_2$, $(NH_4)_2HPO_4$, and $Li_2CO_3$, $Sc_2O_3$, $In_2O_3$, $Y_2O_3$, MgO, or CaO, and a 2% to 10% stoichiometric excess of $Li_2CO_3$ to provide a mixture. The mixtures are ground into a fine powder using a ball mill for 6 to 20 hours in methanol. The mixtures are heat-treated at 900° C. for 6 hours in air, and then reground by the same ball-milling method to provide a powder.

The heat-treated powder is pressed into a pellet at a pressure between 1 and 10 tons in a pellet die. The pellet is sintered for 6 hours in air at a temperature of 1200° C. to provide $Li_{1+x}M_yHf_{1-y}(PO_4)_3$, wherein $Li_{1+x}M_yHf_{1-y}(PO_4)_3$ wherein M is Li, Sc, In, Y, Mg, or Ca, and x is <0.5 and y is <0.5.

Impedance Analysis of $Li_{1/2}Hf_{1.95}(PO_4)_3$

Figure 5A:
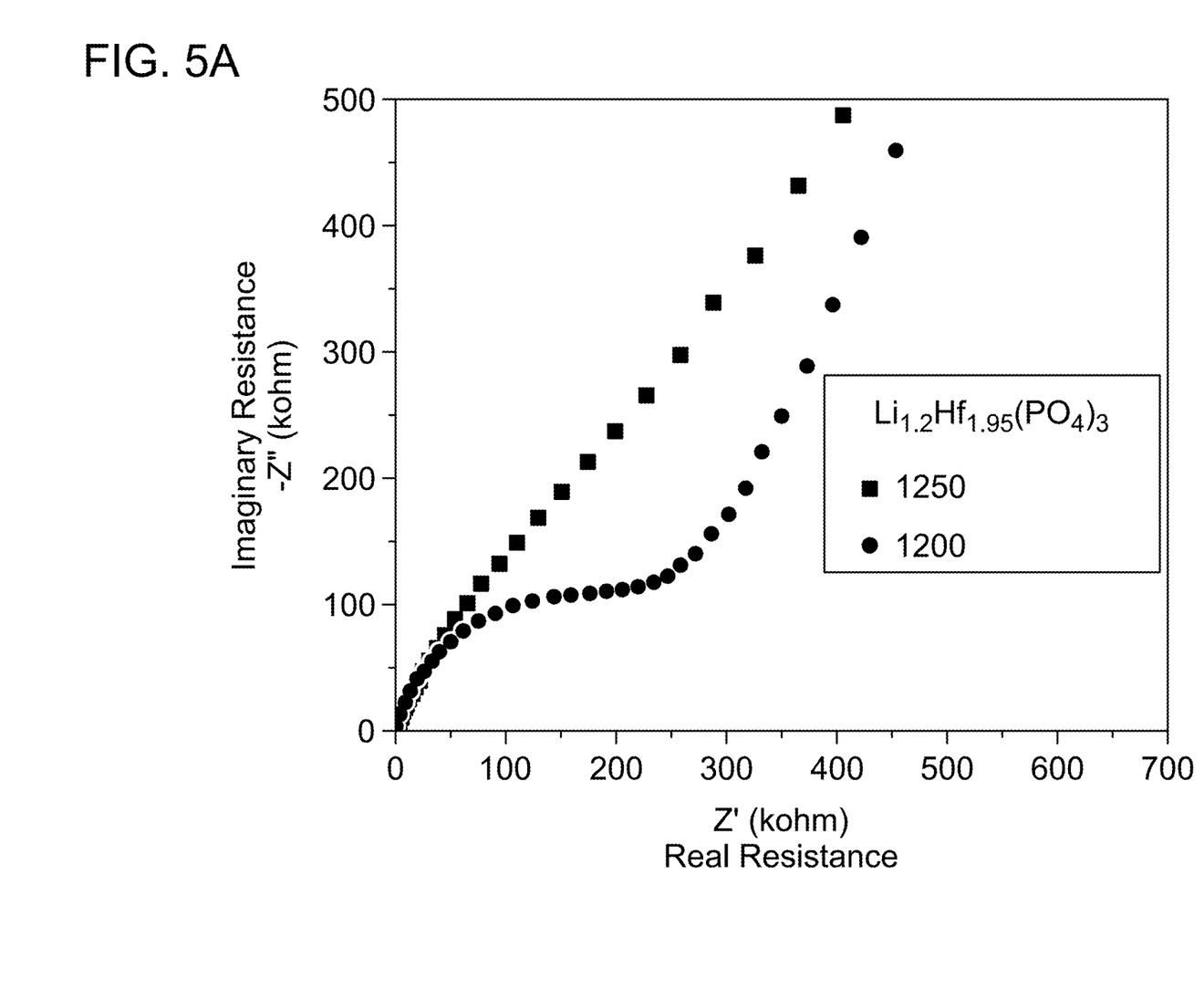
FIG. 5A is a graph of imaginary resistance (kilo-ohms) versus real resistance (kilo-ohms) for $Li_{1/2}Hf_{1.95}(PO_4)_3$.
Figure 5B:
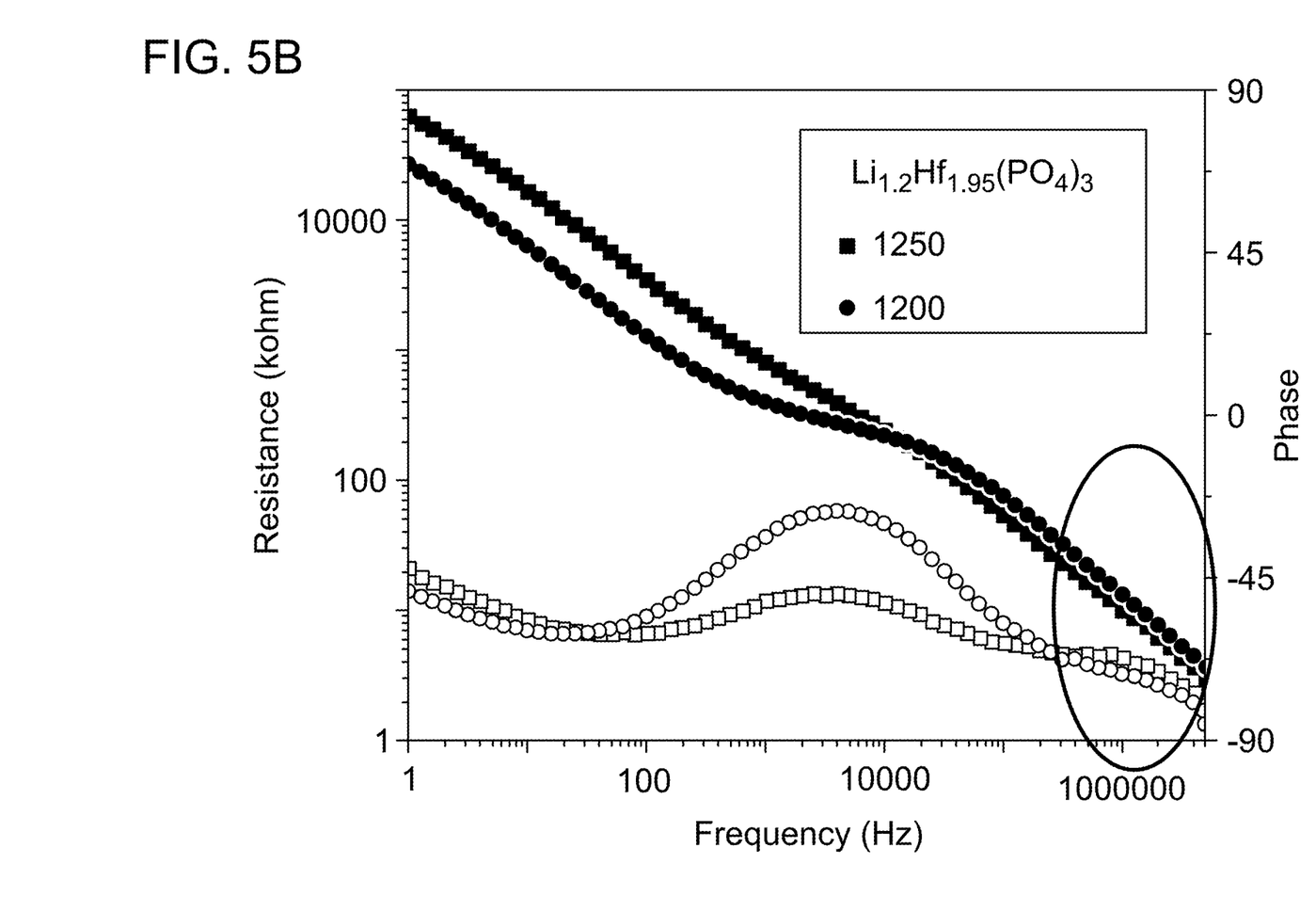
FIG. 5B is a graph of resistance (kilo-ohms) and phase (degrees) versus frequency (Hertz, Hz) for $Li_{1.2}Hf_{1.95}(PO_4)_3$.

Two samples of the $Li_{1.2}Hf_{1.95}(PO_4)_3$ prepared above (i.e., $Li_{1+3x}M_xHf_{2-x}(PO_4)_3$ wherein M is $Li^+$ and x=0.05), prepared with sintering temperatures of 1200° C. and 1250° C. are analyzed by impedance analysis, the results of which are shown in FIGS. 5A and 5B. As shown in FIGS. 5A and 5B, $Li_{1.2}Hf_{1.95}(PO_4)_3$ provides a lithium-ion conductivity of 0.05 milliSiemens per centimeter (mS/cm) at 21° C.

The compound of Formula 1, when synthesized with Li as the dopant to provide $Li_{1.2}Hf_{1.95}(PO_4)_3$, equivalent to writing its composition as $Li_{1+3x}M_xHf_{2-x}(PO_4)_3$ with M=$Li^+$ and x=0.05, shows high Li ionic conductivity of 0.05 mS/cm at room temperature, as shown in FIG. 5B for $Li_{1.2}Hf_{1.95}(PO_4)_3$ materials sintered at 1250° C. (square) and 1200° C. (circle), respectively.

While a particular embodiment has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A compound of the formula wherein $0<\alpha\leq\frac{2}{3}$, and $0\leq\delta\leq0.1$.

2. A protected negative electrode, comprising:
a negative active material; and
the compound of claim 1 on a surface of the negative active material.

3. An electrolyte composition, the composition comprising the compound of claim 1.

4. A separator, comprising:
a microporous film, and
the compound of claim 1 on the microporous film.

5. A protected positive active material comprising:
positive active material a lithium transition metal oxide, a lithium transition metal phosphate, a sulfide, or a combination thereof, and
the compound of claim 1 on a surface of the positive active material.

6. A lithium battery, comprising:
a negative electrode;
an electrolyte; and
a positive electrode,
wherein the electrolyte is between the negative electrode and the positive electrode, and
wherein the negative electrode comprises the protected negative electrode of claim 2.

7. A lithium battery, comprising:
a negative electrode;
an electrolyte; and
a positive electrode,
wherein the electrolyte is between the negative electrode and the positive electrode, and
wherein the positive electrode comprises the protected positive active material of claim 5.

8. A lithium battery, comprising:
a negative electrode;
an electrolyte; and
a positive electrode,
wherein the electrolyte is between the negative electrode and the positive electrode, and
wherein the electrolyte comprises the compound of claim 1.

9. A lithium battery, comprising:
a negative electrode;
a separator comprising a microporous film; and
a positive electrode,
wherein the electrolyte is between the negative electrode and the positive electrode, and
wherein the separator comprises the compound of claim 1.

10. A method of manufacturing the compound of claim 1, the method comprising:
contacting a compound comprising lithium, a compound comprising hafnium, and a compound comprising element La to form a mixture; and
heat-treating the mixture to manufacture the compound of the formula $$Li_{1+\alpha}Hf_{2-\alpha}La_{\alpha}(PO_{4-\delta})_3$$

wherein $0<\alpha<2/3$, and $0\leq\delta\leq0.1$.

11. A method of manufacturing a lithium battery, the method comprising:
providing a negative electrode;
providing a positive electrode; and
disposing a solid electrolyte between the positive electrode and the negative electrode,
wherein at least one of the negative electrode, the positive electrode, and the solid electrolyte comprises the compound of claim 1.

* * * * *

UNITED STATES PATENT AND TRADEMARK OFFICE
CERTIFICATE OF CORRECTION

| | | |
|---|---|---|
| PATENT NO. | : 11,658,336 B2 | Page 1 of 1 |
| APPLICATION NO. | : 16/550777 | |
| DATED | : May 23, 2023 | |
| INVENTOR(S) | : Yan Wang et al. | |

It is certified that error appears in the above-identified patent and that said Letters Patent is hereby corrected as shown below:

On the Title Page

Item (54) and in the Specification Column 1, Lines 1-6 In the title, delete "LITHIUM-ION SOLID STATECONDUCTOR CONTAINING A COMPOUND OF $LI1_{+}(4-a) \alpha HF2-\alpha Ma\alpha(PO4-\delta)3$, ELECTRODE AND BATTERY INCLUDING THE CONDUCTOR, AND METHODS OF MANUFACTURE THEREOF" and insert therefor --LITHIUM-ION SOLID STATE CONDUCTOR, ELECTRODE AND BATTERY INCLUDING THE CONDUCTOR, AND METHODS OF MANUFACTURE THEREOF--

Signed and Sealed this
Eighteenth Day of July, 2023

Katherine Kelly Vidal
*Director of the United States Patent and Trademark Office*